US011206941B2

(12) United States Patent
Abdo et al.

(10) Patent No.: US 11,206,941 B2
(45) Date of Patent: Dec. 28, 2021

(54) HIGH TORQUE MAGNETIC TRANSMISSION FOR WHISK

(71) Applicant: NESTEC S.A., Vevey (CH)

(72) Inventors: Samer Abdo, Lonay (CH); Da Mi Byun, Lausanne (CH); Sylvain DeCastel, Remaufens (CH); Bertrand Guyon, Saint Point Lac (FR); Johan Nieuwendijk, Vienna (AT); Mohamed Raad, Lausanne (CH); Martino Ruggiero, Lonay (CH); Laurent Seydoux, Gillarens (CH); Wolfgang Tuider, Oberwart (AT)

(73) Assignee: Societe des Produits Nestle S.A., Vevey (CH)

( * ) Notice: Subject to any disclaimer, the term of this patent is extended or adjusted under 35 U.S.C. 154(b) by 278 days.

(21) Appl. No.: 16/461,894

(22) PCT Filed: Dec. 11, 2017

(86) PCT No.: PCT/EP2017/082211
§ 371 (c)(1),
(2) Date: May 17, 2019

(87) PCT Pub. No.: WO2018/108807
PCT Pub. Date: Jun. 21, 2018

(65) Prior Publication Data
US 2019/0328167 A1  Oct. 31, 2019

(30) Foreign Application Priority Data
Dec. 13, 2016 (EP) .................................... 16203749

(51) Int. Cl.
*A47J 27/00* (2006.01)
*A47J 43/046* (2006.01)
(Continued)

(52) U.S. Cl.
CPC ......... *A47J 27/004* (2013.01); *A47J 43/0465* (2013.01); *A23V 2002/00* (2013.01);
(Continued)

(58) Field of Classification Search
CPC .. A47J 27/004; A47J 43/0465; A47J 43/0722; B01F 13/08; B01F 7/00225
(Continued)

(56) References Cited

U.S. PATENT DOCUMENTS 1,242,493 A * 10/1917 Stringham .......... B01F 13/0863
366/274
1,420,774 A * 6/1922 Forest ................. B01F 13/0854
366/274
(Continued)

FOREIGN PATENT DOCUMENTS

CA       2360525 C     6/2004
CN     102056782 A     5/2011
(Continued)

OTHER PUBLICATIONS

European Patent Office Communication for Application No. 17816688.0-1004, dated May 14, 2021, 6 pages.
(Continued)

*Primary Examiner* — Tony G Soohoo
(74) *Attorney, Agent, or Firm* — K&L Gates LLP

(57) ABSTRACT

A machine (1) for stirring a liquid food substance has: a container (10) delimiting a cavity (11) with a bottom (12) and a peripheral wall (13) for containing the liquid food substance to be stirred; an impeller (20) comprising an impelling member (21) which is configured to be rotated in the cavity (11), the impeller (20) including an arrangement of driven magnetic elements (26) in the form of permanent magnets; and a motor (30) having an output shaft (31) that is magnetically coupled to the impelling member (21) via
(Continued)

the container bottom (12) and/or peripheral wall (13) for driving the impelling member (21), the output shaft (31) driving an arrangement of driving magnetic elements (36, 36') that cooperate magnetically with the driven magnetic elements (26) so as to drive the impeller (20) in rotation. One of the driven magnetic elements (26) is positioned to: generally face a first driving magnetic element (36) in a generally attraction orientation relative to said one driven magnetic element (26), the first driving magnetic element (36) driving this one driven magnetic element (26) in rotation; and be off-set relative to a second driving magnetic element (36') in a generally repulsion orientation relative to the one driven magnetic element (26), the second magnetic element (36') driving the one driven magnetic element (26) in rotation.

19 Claims, 2 Drawing Sheets

(51) Int. Cl.
  *A47J 43/07* (2006.01)
  *B01F 7/00* (2006.01)
  *B01F 13/08* (2006.01)

(52) U.S. Cl.
  CPC ....... *A47J 43/0722* (2013.01); *B01F 7/00225* (2013.01); *B01F 13/08* (2013.01)

(58) Field of Classification Search
  USPC .................................................. 366/273, 274
  See application file for complete search history.

(56) References Cited

U.S. PATENT DOCUMENTS

| | | | | |
|---|---|---|---|---|
| 2,459,224 A * | 1/1949 | Hendricks | ........... | A47J 43/0465 366/274 |
| 2,549,121 A * | 4/1951 | Osterheld | ........... | A47J 43/0465 366/274 |
| 2,702,571 A * | 2/1955 | Murray | ............... | B01F 13/0863 241/294 |
| 3,028,476 A * | 4/1962 | Hug | ..................... | H02K 49/108 219/443.1 |
| 3,138,370 A * | 6/1964 | Anderson | ........... | B01F 13/0818 366/274 |
| 3,242,528 A | 3/1966 | Elder | | |
| 3,265,369 A * | 8/1966 | Harrison | ................. | B08B 3/104 366/274 |
| 3,333,829 A * | 8/1967 | Moore | ................ | B01F 13/0818 366/145 |
| 3,362,692 A * | 1/1968 | Iannone | .............. | B01F 13/0818 366/274 |
| 3,376,878 A * | 4/1968 | Shoemaker | .......... | A61C 17/036 134/188 |
| 3,421,528 A * | 1/1969 | Gomez | ................ | A61C 17/036 134/188 |
| 3,614,959 A * | 10/1971 | Schollmaier et al. | ...................... A45C 11/005 134/117 | |
| 4,209,259 A * | 6/1980 | Rains | ................... | B01F 13/0827 366/273 |
| 4,653,519 A * | 3/1987 | Kanner | ................ | A45C 11/005 134/140 |
| 4,869,164 A * | 9/1989 | Takeyama | ............. | A47J 43/046 99/483 |
| 6,095,677 A | 8/2000 | Karkos, Jr. et al. | | |
| 6,318,247 B1 * | 11/2001 | Di Nunzio | ............ | A47J 27/004 366/146 |
| 6,758,593 B1 * | 7/2004 | Terentiev | .............. | A61M 60/82 366/273 |
| 7,669,517 B2 * | 3/2010 | Boussemart | ........ | B01F 13/0872 99/287 |
| 10,807,049 B2 * | 10/2020 | Abdo | .................. | A47J 43/0465 |
| 2002/0044496 A1 | 4/2002 | Lawson | | |
| 2005/0023193 A1 * | 2/2005 | Kim | ....................... | C02F 1/481 210/85 |
| 2012/0291637 A1 | 11/2012 | Yu | | |
| 2016/0235251 A1 | 8/2016 | Carella et al. | | |

FOREIGN PATENT DOCUMENTS

| | | |
|---|---|---|
| RU | 2340274 C2 | 12/2008 |
| WO | 2009135759 A1 | 11/2009 |

OTHER PUBLICATIONS

Russia Patent Office Communication for Application No. 2019115353/03(029239) dated Apr. 20, 2021, 13 pages.
China Patent Office Communication for Application No. 201780072621.2, dated Sep. 28, 2021, 21 pages.

* cited by examiner

HIGH TORQUE MAGNETIC TRANSMISSION FOR WHISK

CROSS REFERENCE TO RELATED APPLICATIONS

The present application is a National Stage of International Application No. PCT/EP2017/082211, filed on Dec. 11, 2017, which claims priority to European Patent Application No. 16203749.3, filed on Dec. 13, 2016, the entire contents of which are being incorporated herein by reference.

FIELD OF THE INVENTION

The field of the invention pertains to machines for processing a liquid food substance, such as milk or a milk-containing substance. The machine is provided with a magnetically-driven impeller in a cavity for processing the liquid food substance.

BACKGROUND ART

Specialty beverages in which at least a portion is made up of frothed or heated milk are becoming more and more popular. The best-known beverage of this type is a coffee of the cappuccino type. It comprises a liquid portion consisting of coffee topped by a layer of frothed milk which, because of its very much lower density, floats atop the surface of the liquid. In general, preparing one takes time, manipulation operations and cleaning.

The most customary way of preparing a milk-based froth is to pour the desired amount of milk into the container, immerse a steam outlet pipe from a coffee machine in the container, agitating it up and down to introduce the air needed to form the froth.

There also exists mechanical stirring appliances which are usually intended for domestic use for beating froth from more or less viscous food products such as eggs, ice, juices or the like. These appliances are usually ill-suited to froth the microbiologically sensitive liquids such as milk. Regular cleaning of the tank of the appliance needs to be envisaged in order to remove any solid food residue. In addition, heating the milk has a tendency to increase the extent to which cooked or burnt proteins are deposited on and adhere to the surfaces. The existing appliances are not, for the most part, well suited to reducing the encrustation of this solid residue, making cleaning troublesome. These appliances also have a stirring and drive mechanism which is fixed and intrudes into the tank, and this presents several disadvantages: the removal/refitting time is not insignificant, they have a tendency to become soiled more quickly, they entail additional cost as a result of the multiplicity of components, and the stirring means are difficult to clean.

U.S. Pat. No. 6,318,247 relates to an appliance for preparing hot beverages or food with stirring such as hot chocolate, for example. Other devices for stirring food products are described in patent documents WO 2004/043213 or DE 196 24 648. Stirring systems with a magnetic engagement type are described in documents U.S. Pat. No. 2,932,493, DE 1 131 372, U.S. Pat. Nos. 4,537,332 and 6,712,497. DE 89 15 094 relates to a refrigerated pot for dispensing a milk-based beverage. U.S. Pat. No. 3,356,349 discloses a stirring device that has a heated tank, magnetic drive means positioned under the tank for driving a hub located in the middle of the tank.

An improved appliance for preparing froth from a milk-based liquid or milk has been proposed in WO 2006/050900, WO 2008/142154, WO 2011/039222 and WO 2011/039224. The device has: an inner tank for receiving the liquid that is to be frothed, in which a rotatable stirrer is positioned; an outer stand holding the tank; drive and control means which are in a cavity located between the inner tank and the outer stand, and which communicate with a switch and electrical connections located on the outer surface of the stand; and disturbance means to optimise circulation of the milk during frothing. In WO 2010/023313 a steam source is associated with the stirring effect.

More recently, it has been proposed, as described in WO 2009/074555 and WO 2011/144647, to provide a coffee machine with this type of milk conditioning tank.

Further configurations for processing a milk-based liquid or milk have been proposed in PCT/EP16/063667, PCT/EP16/063664, PCT/EP16/063665 and PCT/EP16/063666.

SUMMARY OF THE INVENTION

It is a preferred object of the present invention to provide a machine for processing a liquid food substance which provides a stirring configuration driven by a easily releasable, high-torque magnetic coupling.

Another preferred object of the present invention is to provide a hygienic machine for heating or cooling a liquid food substance.

A further preferred object of the present invention is to provide a machine for processing a liquid food substance with improved mechanical food conditioning of the liquid food substance.

Hence, the invention relates to a machine for stirring a liquid food substance, such as milk or a milk-based substance, as a standalone machine or as a machine incorporated in a food processor such as a beverage maker e.g. a coffee maker.

The machine may be a standalone machine, e.g. directly pluggable to the mains via an electric cord, or may be integrated in a food processor arranged to process other food items or to carry out different food conditioning processes, the food processor itself being generally pluggable to the mains via an electric cord whereas the machine is a sub-part of the food processor. Such a food processor may be a beverage maker, such as a coffee or chocolate maker, e.g. a beverage maker configured to prepare a beverage (such as coffee or chocolate) from an ingredient capsule.

Standalone and integrated associations of milk frothing machines and coffee makers are for example disclosed in WO 2006/050900, WO 2008/142154, WO 2009/074555, WO 2010/023312 and WO 2010/023313.

Hence, the machine can be suitable for frothing milk by incorporating finely divided gas bubbles, e.g. air bubbles, into milk. When the machine is configured for incorporating gas bubbles into the milk, it may include a further operating mode without incorporation of gas bubbles (e.g. a heating or cooling mode).

The machine includes a container delimiting a cavity with a bottom and a peripheral wall for containing such liquid food substance to be stirred. The cavity extends generally along a generally upright central container axis and has a mouth for removing from the container the liquid food substance upon stirring.

The mouth may be covered with a lid for confining the liquid food substance within the cavity.

The container can be generally cup-shaped or bowl-shaped or cylinder-shaped, the peripheral wall being generally upright and the bottom being generally flat or curved.

The container can be provided with a thermally insulating outside material and/or with a handle, for seizure and optional displacement of the container by a human hand. Such a configuration is particularly advantageous when the food is processed at a higher temperature exceeding e.g. 50° C. or below 10° C.

The machine has an impeller comprising an impelling member, e.g. a whisk or wipe or emulsify plate. Such member is configured to be rotated in the cavity against such liquid food substance about an impeller axis that is generally identical or generally parallel to the container axis.

The impelling member may extend over a predominant part of the bottom of the cavity. In this case, the impelling member can generally have or comprise a plate shape, e.g. disk shape.

The impelling member can extend across a substantial part of the bottom of the cavity along a diameter thereof. In this case, the impelling member can be an elongated generally rod-shaped or bar-shaped member (e.g. extending along the bottom wall's diameter) or be formed of a plurality of such elongated members (e.g. up to 6 or 10) in a star arrangement.

The impelling member may extend: over a predominant part of the bottom of the cavity, the impelling member extending typically over at least 75 or 85% of a surface area of the bottom; across a substantial part of the bottom along a diameter thereof, the impelling member extending typically over at least 75 or 85% of a diameter of the bottom.

Suitable examples of shapes of impelling members are disclosed in WO 2006/050900, WO 2008/142154 and PCT/EP16/063667.

The impeller includes an arrangement of driven magnetic elements in the form of permanent magnets.

The impelling member can have a processing surface for imparting a mechanical effect to the liquid food substance, such as for mixing the liquid food substance with another fluid, e.g. air.

The machine incorporates a motor having an output shaft that is magnetically coupled to the impelling member via the container bottom and/or peripheral wall for driving the impelling member. The output shaft drives an arrangement of driving magnetic elements that cooperate magnetically with the driven magnetic elements so as to drive the impeller in rotation.

The arrangement of driving magnetic elements can be located adjacent a peripheral part of the cavity's bottom or around the cavity's peripheral wall.

In accordance with the invention, one of these driven magnetic elements is positioned to:
  generally face a first driving magnetic element in a generally attraction orientation relative to this one driven magnetic element, such first driving magnetic element driving this one driven magnetic element in rotation, such first driving magnetic element being optionally an attracting electromagnet or permanent magnet; and
  be off-set relative to a second driving magnetic element in a generally repulsion orientation relative to this one driven magnetic element, such second magnetic element driving this one driven magnetic element in rotation, such second driving magnetic element being optionally a repulsive electromagnet or permanent magnet and/or being positioned adjacent to said first driving magnetic element.

Each driven magnetic element may be positioned to generally face a respective first driving magnetic element in a generally attraction orientation and to be off-set relative to a respective second driving magnetic element in a generally repulsion orientation.

The first and second driving magnetic elements can be in a ring-like arrangement and/or located in or on a driving disc. The arrangement of driven magnetic elements may be in a configuration that has one or more of the following features:
  in a generally parallel e.g. generally collinear orientation with at least some of the first and second driving magnetic elements;
  located in or on a support rotating the impelling member, e.g. in or on a driven disc and/or in or on cavities or openings of such support; and
  in a ring-like arrangement, e.g. a ring-like arrangement in a ring corresponding to and facing a ring containing a ring-like arrangement of the first and second driving magnetic elements.

The or each driven magnetic element may generate with:
  its corresponding first driving magnetic element that is in a generally attraction orientation a cumulated attractive magnetic field; and
  its corresponding second driving magnetic element that is in a generally repulsion orientation a cumulated repulsive magnetic field.

The cumulated repulsive magnetic field may be greater than the attractive magnetic field. For example, the second driving magnetic element in the generally repulsion orientation generates a magnetic field greater than the magnetic field generated by the first driving magnetic element in the generally attraction orientation.

The cumulated repulsive magnetic field and the cumulated attractive magnetic field may have a ratio of at least 1.02, such as a ratio in the range of 1.03 to 1.25, for instance 1.05 to 1.2, for example 1.08 to 1.15, e.g. in the range of 1.11 to 1.13.

When placed against an iron plate, the first driving magnetic element and the driven magnetic element may each exhibit a force in the range of 5 to 15 N, e.g. about 9 to 12 N, and the second driving magnetic element may exhibit a force in the range of 10 to 25 N, e.g. about 15 to 20 N.

When placed against an iron plate, the total force of all the first driving magnetic elements may be in the range of 25 to 75 N, e.g. about 45 to 60 N.

When placed against an iron plate, the total force of all the second driving magnetic elements may be in the range of 50 to 125 N, e.g. about 75 to 100 N.

To remove the impeller when in place in the cavity in a position for being rotated against the liquid food substance, it may be necessary to exercise a force on the impeller in a direction away from the arrangement of driving magnetic elements. Such exercised removal force may be in the range of 1 to 50 N, such as 3 to 30 N, for instance 4 to 15 N, e.g. 5 to 10 N.

When in place in the cavity in a position for being rotated against the liquid food substance the arrangement of driving magnetic elements may be spaced from the driving magnetic elements by a distance in the range of 2 to 15 mm, such as 3 to 10 mm, e.g. 4 to 7 mm.

In such a configuration, all magnetic elements can be used for driving (magnetically pushing or pulling) the impeller. By providing a configuration where some magnets operate in attraction and some in repulsion, the overall attraction force between the impeller and the output shaft can be reduced while increasing the maximum torque that can be transmitted from the output shaft to the impeller. Hence, impellers with high inertia and/or for operating in (relatively) high viscosity liquid food substances can be used and also be removed from the cavity without requiring the user to exercise a relatively high force for such removal.

Moreover, by providing one driven magnetic element at the side of the impeller for two driving magnetic elements (in attraction and in repulsion) at the side of the output shaft, the inertia (caused by the weight) at the impeller's side can be reduced while maintaining a good magnetic transmission of the torque.

In an embodiment, the impeller is provided with a total number of driven magnetic elements in the range of 2 to 10, e.g. in the range of 4 to 8, the total number of driving magnetic elements at the level of the drive shaft being double the number of driven magnetic elements.

The motor can be located in a motor chamber separate from the container cavity, such as a motor chamber that is located in a docking station for removably receiving the container.

The motor chamber may include one or more electric components, such as a component in the form of a generator of an oscillating electromagnetic field directed to the container for heating the liquid food substance in the container.

One or more of the electric components can include at least one of a control unit and a power management unit.

The motor chamber may be associated with means for evacuating undesired heat, e.g. as disclosed in PCT/EP16/063668.

The container can be mounted, such as removably mounted, on or in the docking station. The container may be assembled to or on the docking station or simply placed on or in the docking station. For instance, the container is removable from the docking station for normal operation, e.g. to dispense the food substance, e.g. milk, from the container. The container can be removable from the docking station for servicing or maintenances purposes only.

The container may be mechanically passive. Hence, beyond the inherent mechanical properties of the materials making its structure for containing the food substance and for being integrated or assembled in the machine, the container may be free of any mechanically active part such as a motor or movement transformation system which may require special care for hygiene or cleaning purposes.

The container may be electrically passive. Hence, beyond the inherent electric properties of the materials making its structure for containing the food substance and for being integrated or assembled in the machine, the container may be free of any electric active parts such as an electric circuit of discrete or integrated components (e.g. resistors, inductances, transistors, . . . ) that require special care for hygiene or cleaning purposes.

By providing a container which is mechanically and/or electrically passive (optionally with a lid that is equally passive), it can easily be cleaned, e.g. in a dishwater, without any risk of damaging electric and/or mechanic components.

The machine may include a thermal conditioner for thermally conditioning the liquid food substance in the cavity, such as a heater and/or a cooler, e.g. a resistive, inductive or radiating thermal conditioner.

The thermal conditioner can be configured to heat the cavity's peripheral wall and/or bottom from outside the cavity to thermally condition the liquid food substance contained in the cavity.

The machine may incorporate a control system of the thermal conditioner (heating and/or cooling) for:

carrying out different thermal conditioning profiles over time and/or for carrying out one or more thermal conditioning profiles of constant or variable value; and/or disabling the thermal conditioning.

Examples of suitable thermal conditioners are disclosed in WO 2006/050900, WO 2008/142154 and PCT/EP16/063668.

The impelling member can be configured to be spaced above the cavity's bottom by: a maximum stirring distance when the impelling member is rotated at a maximum stirring level at a maximum stirring speed about the impeller axis; and a resting distance when the impelling member stands still at a resting level. The maximum stirring distance can be greater than the resting distance.

The maximum stirring speed may be sufficiently high for frothing the liquid food substance when such food substance can be frothed, e.g. milk or a milk-based substance.

The maximum stirring speed of the impelling member may be a rotational speed in the range of 300 to 10000 RPM, for instance 500 to 7500 RPM, such as 800 to 5000 RPM, e.g. 1000 to 3000 RPM.

For instance, the maximum stirring distance exceeds the resting distance by a distance difference in the range of 0.5 to 6 cm, such as 1 to 4 cm, e.g. 1.5 to 3 cm.

In other words, when the impeller is rotated to impart a mechanical effect onto the liquid food substance by contacting it during its rotation, the impeller is located well in the body formed by the liquid food substance so that the liquid food substance is well exposed to the rotating impeller. Conversely, when the impeller is standing still, the impeller member is at a retracted position (at or closer to the container's bottom) to reduce or prevent any interference between the impeller and the removal of the processed liquid food substance, e.g. by dipping a spoon into the body of processed liquid food substance or by pouring it via the container's mouth.

The impelling member may be configured to be spaced above the cavity's bottom by a distance smaller than the maximum stirring distance, e.g. by the resting distance, when it is rotated at a lower stirring level at a slower stirring speed about the impeller axis, the slower stirring speed being slower than the maximum stirring speed. For instance, the slower stirring speed is below 25% of the maximum stirring speed, such as below 10%, e.g. below 3%, for example below 1%, e.g. below 0.25% of the maximum stirring speed.

The level of the impelling member above the cavity's bottom may depend of the speed of the impelling member at which it is rotated about the impeller axis.

The level of the impelling member above the cavity's bottom may depend of a viscosity of the liquid food substance that is being stirred and that may even change during the stirring, for instance when the liquid food substance is being frothed e.g. milk that is being frothed.

The machine may include one or more travel stops for preventing the impelling member from moving above a maximum height when rotated. For example, such stop projects from the peripheral wall towards the container axis and/or such stop is formed on a guide of the impeller and interferes with an upward movement of the impeller member above the maximum height.

The machine may include one or more travel stops for preventing the impelling member from moving below a minimum height when standing still. For example, such stop projects from the peripheral wall towards the container axis or is formed by the bottom and/or a stop is formed by a foot of the impeller and interferes with a downward movement of the impeller member below the minimum height.

By using an appropriate stop (e.g. a geometrical stop), the impelling member may be maintained in the container's cavity when the container is tilted (e.g. for dispensing its content) under the action of the stop. In such a case, for removing the impelling member from the cavity, the stop and/or the impelling member can be made deformable, e.g. resiliently deformable, so that it is removable by applying sufficient pressure and/or force.

The machine may have a guide for guiding the impelling member between the maximum stirring level and the resting level, such as at least one guide formed by: the container's peripheral wall; a central axle of the container or of the impeller; and a peripheral upright guide surface of the impeller.

Such guide, e.g. the central axle, may bear a marking at or up to a maximum level of filling the cavity with the liquid food substance before stirring thereof. The guide can be free of any marking indicating a level of filling above the maximum level of filling. The maximum level of filling may be located above the cavity's bottom at an average vertical distance from the bottom that is smaller than $2/3$ of an average vertical distance spacing the cavity's bottom from the cavity's mouth, such as smaller than $1/2$, for example smaller than $1/3$ e.g. $1/4$, of the average vertical distance spacing the cavity's bottom from the cavity's mouth.

The guide, e.g. the central axle, may bear a marking at or down to a minimum level of filling the cavity with the liquid food substance before stirring thereof. The guide can be free of any marking indicating a level of filling below the minimum level of filling. The minimum level of filling can be located above the resting level of the impelling member, e.g. above the maximum stirring level of the impelling member or above $1/4$ of the vertical way separating the resting level from the maximum stirring level.

Such marking can thus be used as a readily visible indicator or warning for the user to fill the cavity with the liquid food substance (prior to stirring) within a workable range. By omitting a marking at levels at which the filling of the liquid food substance should not be provided, the user is discouraged from filling the container's cavity at such undesirable levels.

By providing, in an exemplary mode, the marking on a central axle of the container's cavity or of the impeller, continuously or intermittently around the entire perimeter of the axle, the marking can be made visible from any (horizontal) angle around the cavity's mouth so that the user does not have to turn the container or turn around the container's mouth to find the marking for selecting the proper level of fill. Even though slightly less convenient, the marking may be provided continuously or intermittently around the entire perimeter of the cavity, e.g. of its peripheral wall.

The impelling member may be arranged to be driven automatically towards the cavity's bottom when the speed of rotation of the impelling member is lowered from the maximum stirring speed towards stand still, for instance under the effect of gravity and/or magnetic effect.

The impelling member can be provided with one or more magnetic elements which cooperate(s) with one or more magnetic elements that is/are located above the impelling member's magnetic element(s) in a repulsion arrangement and/or located below the impelling member's magnetic element(s) in an attraction arrangement.

The repulsion arrangement may be formed by two magnetic field-generating elements generally oriented in mutual repulsion.

The attraction arrangement may be formed by: two magnetic field-generating elements generally oriented in mutual attraction; and/or a magnetic field-generating element and a ferromagnetic element generally oriented in mutual attraction.

By using a magnetic arrangement to maintain the impelling member at or towards the bottom of the container's cavity, the container can be tilted (e.g. for dispensing its content) while the impelling member is prevented or at least inhibited from dropping out of the cavity.

The impeller can have a support that is relatively movable to the impelling member and that is rotated to rotate the impelling member. The support may have a drive surface, such as a drive surface that is formed by a central axle and/or peripheral upright guide surface that is rotated to rotate the impelling member. For instance, the drive surface has a cam that engages with a cam follower of the impelling member, such as a helicoidal cam, for moving the impelling member to the maximum stirring level when the impelling member is rotationally accelerated towards the maximum stirring speed and for moving the impelling member towards the rest level when the impelling member is rotationally decelerated towards stand still.

The drive surface and the impelling member may of course have an inverted cam and cam-follower arrangement, i.e. the cam being on the impelling member and the cam-follower being on the drive surface.

The helicoidal cam (when present) can have a constant or a variable pitch. A variable pitch can be provided to adjust the height of the impelling member according to its rotational speed.

The support may be configured for spacing the impelling member above the cavity's bottom, such as a foot spaced under the impelling member by a distance in the range of 0.5 to 5 cm e.g. 1 to 3.5 cm.

The support can have a downwardly-oriented convex curved contact surface, e.g. a downwardly projecting pin, such that the impeller rests on the bottom wall entirely via this convex curved contact surface. The convex curved contact can be in contact with the bottom wall over a total surface area of typically less than 5 mm$^2$, such as less than 4 e.g. less than 3 for instance less than 2 for example less than 0.3 mm$^2$.

The contact surface can be made of hard polymeric material, such as hard plastic, or of food-safe stainless steel and be supported by a surface of the bottom wall made of ceramic material, such as PTFE, or of food-safe stainless steel e.g. AiSi 304 steel.

The impelling member can have a lifting surface, e.g. a hydrofoil or wing-like shape, to lift the impelling member when in the liquid food substance and when rotationally accelerated towards the maximum stirring speed.

The machine may include a holder, e.g. a removable holder, for holding one or more ingredients and/or one or more thermal-transfer elements. The holder can be connected to the impelling member for being driven with the impelling member in the liquid food substance.

Such one or more thermal-transfer elements may comprise at least one element selected from an ice cube, e.g. a water ice cube or milk ice cube, a heated or cooled insert, such as an inert insert, typically a food-grade insert.

Such one or more ingredients may comprise:
at least one ingredient selected from coffee e.g. instant coffee, cacao, chocolate, sugar, honey, milk and cream; and/or
at least one ingredient supplied in or as a solid ingredient bulk, e.g. generally shaped as a parallelepiped, a prism, a pyramid e.g. a truncated pyramid, a polyhedron e.g. a octahedron or an icosidodecahedron or a rhombicuboctahedron, a cylinder, a cone e.g. a truncated cone, a sphere e.g. a truncated sphere, an ellipsoid e.g. a truncated ellipsoid, or an ovoid e.g. a truncated ovoid.

The holder may form a basket for containing such one or more ingredients and/or one or more thermal-transfer elements, the basket having one or more side openings for an ingredient and/or thermal side transfer from inside to outside the holder. The basket can be formed as a generally continuous single seat or as a plurality of seats for the ingredient(s) and/or thermal-transfer element(s). For instance, the holder has a plurality of seats separated by partitions, e.g. generally radially projecting ribs or wings or edges.

Examples of suitable holders are disclosed in WO 2011/039222 and in WO 2011/039224.

Magnetic field-generating element(s) may include, as appropriate, an electromagnet element or a permanent magnet element, e.g. made of at least one of iron, nickel, cobalt, rare earth metals, e.g. lanthanide, and alloys and oxides containing such metals as well as polymers (e.g. plastics) carrying such elements and components.

Ferromagnetic element(s) can be made of at least one of Co, Fe, $Fe_2O_3$, $FeOFe_2O_3$, $NiOFe_2O_3$, $CuOFe_2O_3$, $MgO Fe_2O_3$, $Nd_2Fe_{14}B$, Mn, Bi, Ni, MnSb, $MnOFe_2O_3$, $Y_3Fe_5O_{12}$, $CrO_2$, MnAs, Gd, Dy, EuO, $Cu_2MnAl$, $Cu_2MnIn$, $Cu_2MnSn$, $Ni_2MnAl$, $Ni_2MnIn$, $Ni_2MnSn$, $Ni_2MnSb$, $Ni_2MnGa$, $Co_2MnAl$, $Co_2MnSi$, $Co_2MnGa$, $Co_2MnGe$, $SmCo_5$, $Sm_2Co_{17}$, $Pd_2MnAl$, $Pd_2MnIn$, $Pd_2MnSn$, $Pd_2MnSb$, $Co_2FeSi$, $Fe_3Si$, $Fe_2VAl$, $Mn_2VGa$ and $Co_2FeGe$.

BRIEF DESCRIPTION OF THE DRAWINGS

The invention will now be described with reference to the schematic drawings, wherein.

DETAILED DESCRIPTION

Figure 1:
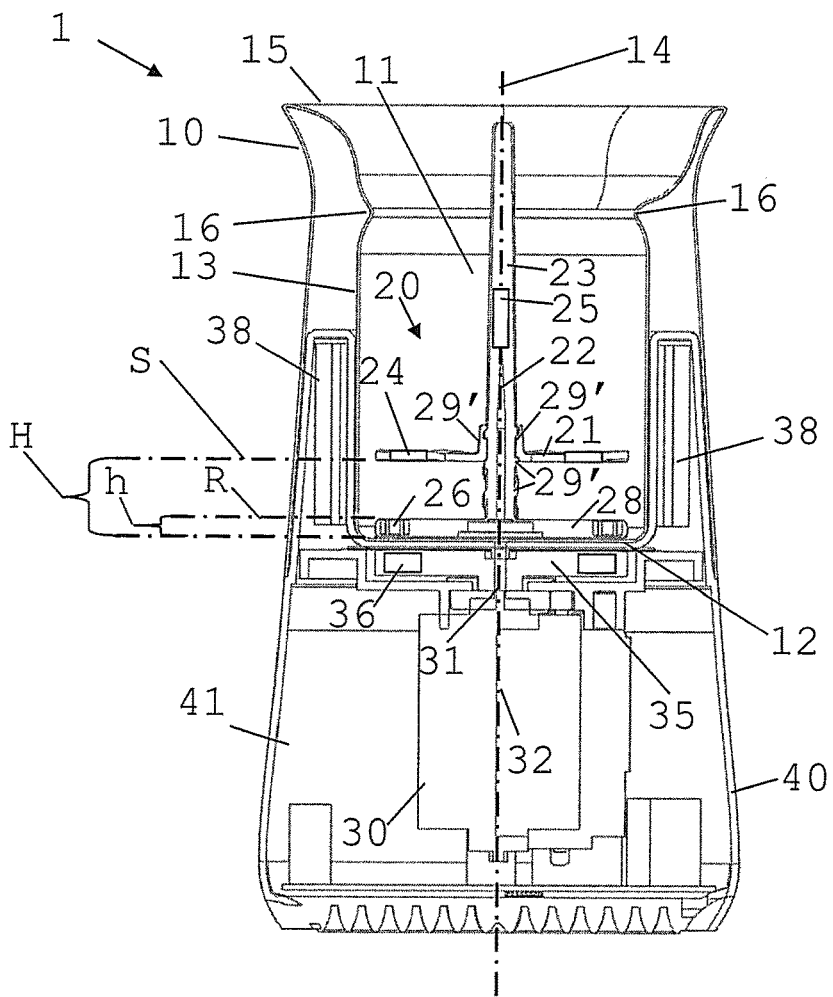
FIG. 1 is a cross-sectional view of a machine according to the invention having an impeller magnetically driven by a motor.
Figures 2, 3:
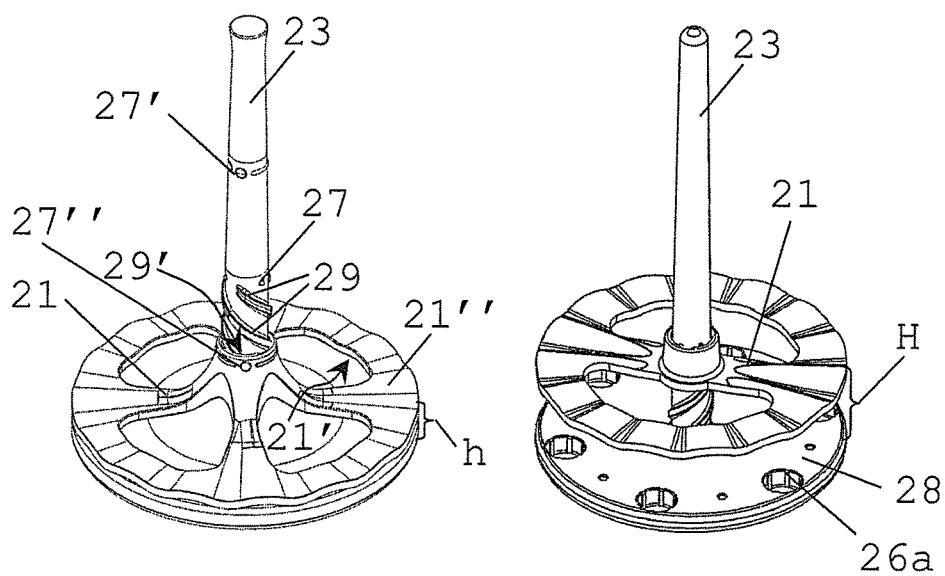
FIG. 2 is a perspective view of an impeller with an impelling member at a resting level that can be fitted in the machine of FIG. 1.
FIG. 3 shows another impeller (having a slightly different design) with an impelling member at a maximum stirring level that can be fitted in the machine of FIG. 1.
Figure 4:
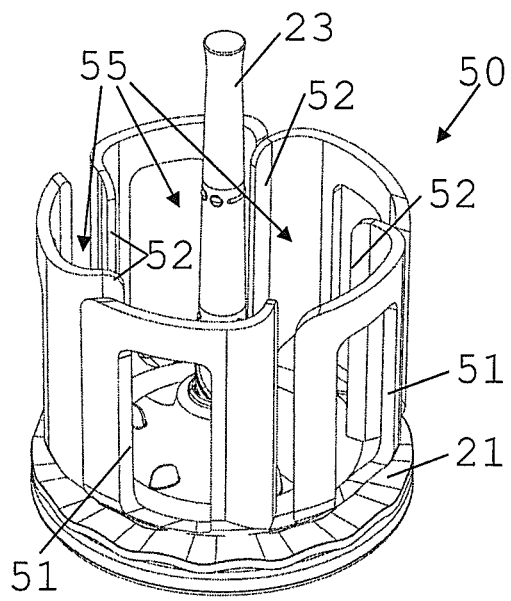
FIG. 4 is a perspective view of a holder for holding one or more ingredients and/or one or more thermal-transfer elements that can be fitted onto the impeller of FIG. 2 or 3.
Figure 5:
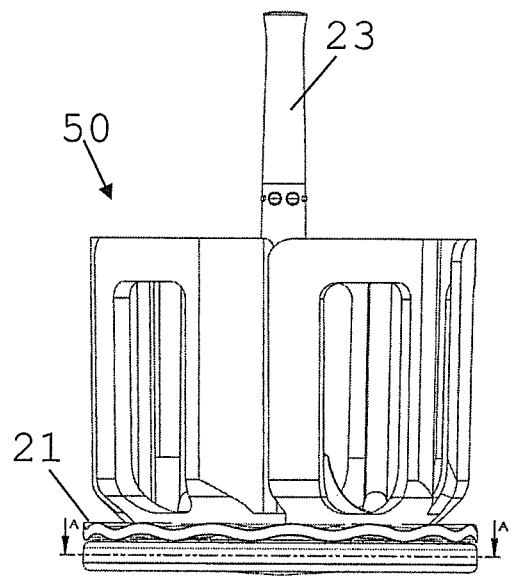
FIG. 5 is a side view of the holder of FIG. 4.
Figure 6:
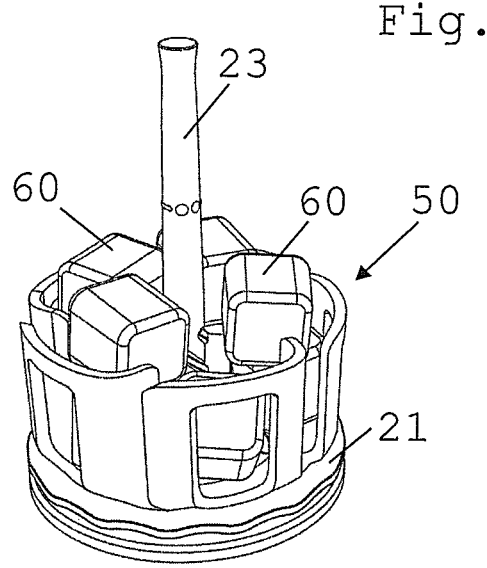
FIG. 6 illustrates the holder of FIGS. 4 and 5 with one or more thermal-transfer elements.
Figure 7:
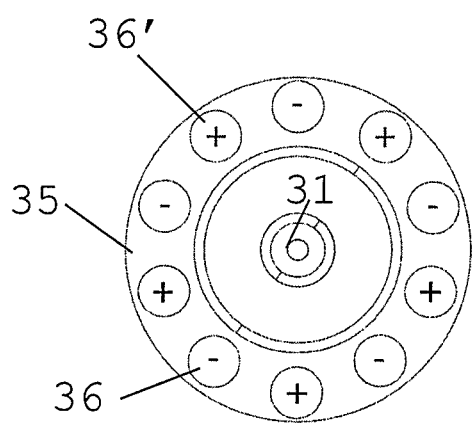
FIG. 7 illustrates an arrangement of driving magnetic elements that can be fitted in the machine of FIG. 1 and connected to the motor for driving the impeller.
Figure 8:
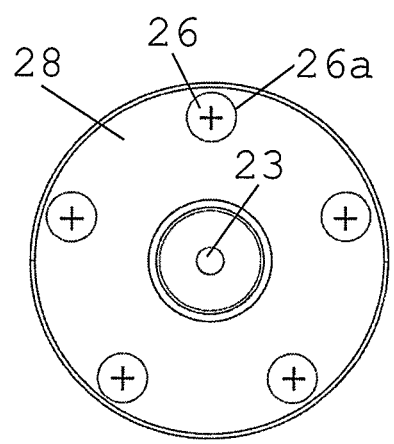
FIG. 8 illustrates an arrangement of driven magnetic elements that can be mounted to the impeller of FIG. 1 so that the impeller can be driven by the arrangement of driving magnetic elements of FIG. 7.

FIGS. 1 to 8, in which the same references generally designate the same elements, illustrate an exemplary embodiment of a machine 1 for stirring a liquid food substance, such as milk or a milk-based substance.

Machine 1 can be a standalone machine or a machine incorporated in a food processor such as a beverage maker e.g. a coffee maker.

Machine 1 includes a container 10 delimiting a cavity 11 with a bottom 12 and a peripheral wall 13 for containing the liquid food substance to be stirred. cavity 11 extends generally along a generally upright central container axis 14 and has a mouth 15 for removing from container 10 the liquid food substance upon stirring.

Impeller 20 has an impelling member 21, e.g. a whisk or wipe or emulsify plate, which is configured to be rotated in cavity 11 against the liquid food substance about an impeller axis 22 that is generally identical or generally parallel to container axis 14. Impeller 20 includes an arrangement of driven magnetic elements 26 in the form of permanent magnets.

Impelling member 21 can have a processing surface 21" for imparting a mechanical effect to the liquid food substance, such as for mixing the liquid food substance with another fluid, e.g. air.

Machine 1 includes a motor 30 having an output shaft 31 that is magnetically coupled to impelling member 21 via container bottom 12 and/or peripheral wall 13 for driving impelling member 21. Output shaft 31 drives an arrangement of driving magnetic elements 36,36' that cooperate magnetically with driven magnetic elements 26 so as to drive impeller 20 in rotation.

One of driven magnetic elements 26 is positioned to:
generally face a first driving magnetic element 36 in a generally attraction orientation relative to such one driven magnetic element 26, first driving magnetic element 36 driving such one driven magnetic element 26 in rotation, first driving magnetic element 36 being optionally an attracting electromagnet or permanent magnet 36; and be off-set relative to a second driving magnetic element 36' in a generally repulsion orientation relative to such one driven magnetic element 26, second magnetic element 36' driving such one driven magnetic element 26 in rotation, second driving magnetic element 36' being optionally a repulsive electromagnet or permanent magnet 36' and/or being adjacent to first driving magnetic element 36.

Each driven magnetic element 26 can be positioned to generally face a respective first driving magnetic element 36 in a generally attraction orientation and to be off-set relative to a respective second driving magnetic element 36' in a generally repulsion orientation.

First and second driving magnetic elements 36,36' may be in a ring-like arrangement and/or located in or on a driving disc 35. The arrangement of driven magnetic elements 26 can be in a configuration that has one or more of the following features:

in a generally parallel e.g. generally collinear orientation with at least some of first and second driving magnetic elements 36,36';

located in or on a support 23,28 rotating impelling member 21, e.g. in or on a driven disc 28 and/or in or on cavities or openings 26a of such support; and in a ring-like arrangement, e.g. a ring-like arrangement in a ring corresponding to and facing a ring containing a ring-like arrangement of first and second driving magnetic elements 36,36'.

The or each driven magnetic element 26 may generate with: its corresponding first driving magnetic element 36 that is in a generally attraction orientation a cumulated attractive magnetic field; and its corresponding second driving magnetic element 36' that is in a generally repulsion orientation a cumulated repulsive magnetic field.

The cumulated repulsive magnetic field can be greater than the attractive magnetic field, e.g. second driving magnetic element 36' in the generally repulsion orientation generating a magnetic field greater than the magnetic field generated by first driving magnetic element 36 in the generally attraction orientation. For instance, the cumulated repulsive magnetic field and the cumulated attractive magnetic field can have a ratio of at least 1.02, such as a ratio in the range of 1.03 to 1.25, for instance 1.05 to 1.2, for example 1.08 to 1.15, e.g. in the range of 1.11 to 1.13.

When placed against an iron plate, first driving magnetic element 36 and driven magnetic element 26 may each exhibit a force in the range of 5 to 15 N, e.g. about 9 to 12 N, and second driving magnetic element 36' may exhibit a force in the range of 10 to 25 N, e.g. about 15 to 20 N.

When placed against an iron plate, the total force of all first driving magnetic elements 36 may be in the range of 25 to 75 N, e.g. about 45 to 60 N.

When placed against an iron plate, the total force of all second driving magnetic elements 36' may be in the range of 50 to 125 N, e.g. about 75 to 100 N.

When placed against an iron plate, the total force of all driven magnetic elements 26 may be in the range of 25 to 75 N, e.g. about 45 to 60 N.

To remove impeller 20 when in place in cavity 11 in a position for being rotated against the liquid food substance, it may be necessary to exercise a force on impeller 20 in a direction away from the arrangement of driving magnetic elements 36,36'. Such exercised removal force may be in the range of 1 to 50 N, such as 3 to 30 N, for instance 4 to 15 N, e.g. 5 to 10 N.

When in place in cavity 11 in a position for being rotated against the liquid food substance the arrangement of driving magnetic elements 36,36' may be spaced from driving magnetic elements 26 by a distance in the range of 2 to 15 mm, such as 3 to 10 mm, e.g. 4 to 7 mm.

Motor 30 may be located in a motor chamber 41 separate from container cavity 11. Motor chamber 41 can be located in a docking station 40 for removably receiving container 10.

Machine 1 may further include a thermal conditioner for thermally conditioning the liquid food substance in cavity 11, such as a heater and/or a cooler, e.g. a resistive, inductive or radiating thermal conditioner. Thermal conditioner 38 can be configured to heat the cavity's peripheral wall 13 and/or bottom 12 from outside cavity 11 to thermally condition the liquid food substance contained in cavity 11.

Impelling member 21 may be configured to be spaced above cavity's bottom 12 by:
   a maximum stirring distance H when impelling member 21 is rotated at a maximum stirring level S at a maximum stirring speed about impeller axis 22; and
   a resting distance h when impelling member 21 stands still at a resting level R.

Maximum stirring distance H may be greater than resting distance h. For instance, maximum stirring distance H can exceed resting distance h by a distance difference in the range of 0.5 to 6 cm, such as 1 to 4 cm, e.g. 1.5 to 3 cm.

Impelling member 21 can be configured to be spaced above cavity's bottom 12 by a distance smaller than maximum stirring distance H, e.g. by resting distance h, when it is rotated at a lower stirring level at a slower stirring speed about impeller axis. The slower stirring speed is slower than the maximum stirring speed. For instance, the slower stirring speed can be below 25% of the maximum stirring speed, such as below 10%, e.g. below 3%, for example below 1%, e.g. below 0.25% of the maximum stirring speed.

The level of impelling member 21 above cavity's bottom 12 may depend of the speed of impelling member 21 at which it is rotated about impeller axis 22 and/or may depend of a viscosity of the liquid food substance that is being stirred.

Machine 1 may comprise one or more travel stops 16,27; 12,28 for preventing the impelling member 21 from moving:
   above a maximum height when rotated, such as a stop 16 projecting from peripheral wall 13 towards container axis 14 and/or a stop 27 formed on a guide 23 of impeller 20 and interfering with an upward movement of impeller member 21 above the maximum height; and/or
   below a minimum height when standing still, such as a stop 12 projecting from peripheral wall 13 towards container axis 14 or formed by bottom 12 and/or a stop 28 formed by a foot 28 of impeller 20 and interfering with a downward movement of impeller member 21 below the minimum height.

Machine 1 may include a guide 13,23 for guiding impelling member 21 between maximum stirring level S and resting level R. For instance, at least one guide is formed by:
   container's peripheral wall (13);
   a central axle 23 of the container or of impeller 20; and
   a peripheral upright guide surface of the impeller, Such guide, e.g. central axle 23, may bear a marking 27,27',27" at or up to a maximum level of filling the cavity 11 with the liquid food substance before stirring thereof, the guide being free of any marking indicating a level of filling above the maximum level of filling 27,27'. The maximum level of filling can be located above cavity's bottom 12 at an average vertical distance from bottom 12 that is smaller than ⅔ of an average vertical distance spacing cavity's bottom 12 from cavity's mouth 15, such as smaller than ½, for example smaller than ⅓ e.g. ¼, of the average vertical distance spacing the cavity's bottom 12 from cavity's mouth 15.

Such guide, e.g. central axle 23, may bear a marking 27,27',27" at or down to a minimum level 27,27" of filling cavity 11 with the liquid food substance before stirring thereof, the guide being free of any marking indicating a level of filling below the minimum level of filling 27,27". The minimum level of filling can be located above resting level R of impelling member 21, e.g. above maximum stirring level S of impelling member 21 or above ¼ of the vertical way separating resting level R from maximum stirring level S.

Impelling member 21 can arranged to be driven automatically towards cavity's bottom 12 when the speed of rotation of impelling member 21 is lowered from the maximum stirring speed towards stand still, for instance under the effect of gravity and/or magnetic effect.

Impelling member 21 can be provided with one or more magnetic elements 24 which cooperate(s) with one or more magnetic elements 25,26,36 that is/are located above impelling member's magnetic element(s) 24 in a repulsion arrangement and/or located below the impelling member's magnetic element(s) 24 in an attraction arrangement.

Repulsion arrangement 24,25 can be formed by two magnetic field-generating elements generally oriented in mutual repulsion.

Attraction arrangement 24,26;24,36 can be formed by: two magnetic field-generating elements generally oriented in mutual attraction; and/or a magnetic field-generating element and a ferromagnetic element generally oriented in mutual attraction.

Impeller 20 may have a support 23,28 that is relatively movable to impelling member 21 and that is rotated to rotate impelling member 21. Support 23,28 can have a drive surface, such as a drive surface that is formed by a central axle 23 and/or peripheral upright guide surface that is rotated to rotate the impelling member. The drive surface may have a cam 29 that engages with a cam follower 29' of impelling member 21 such as a helicoidal cam 29 for moving impelling member 21 to maximum stirring level S when impelling member 21 is rotationally accelerated towards the maximum stirring speed and for moving impelling member 21 towards rest level R when impelling member 21 is rotationally decelerated towards stand still. Of course, the drive surface and the impelling member 21 may have an inverted cam and cam-follower arrangement.

Impelling member 21 may have a lifting surface 21', e.g. a hydrofoil or wing-like shape, to lift impelling member 21 when in the liquid food substance and when rotationally accelerated towards the maximum stirring speed.

Machine 1 may include a holder 50, e.g. a removable holder 50, for holding one or more ingredients and/or one or more thermal-transfer elements 60. Holder 50 can be connected to impelling member 21 for being driven with impelling member 21 in such liquid food substance.

One or more thermal-transfer elements may include at least one element selected from an ice cube, e.g. a water ice cube or milk ice cube, a heated or cooled insert, such as an inert insert, typically a food-grade insert.

One or more ingredients may comprise at least one ingredient selected from coffee e.g. instant coffee, cacao, chocolate, sugar, honey, milk and cream.

One or more ingredients may include at least one ingredient supplied in or as a solid ingredient bulk, e.g. generally shaped as a parallelepiped, a prism, a pyramid e.g. a truncated pyramid, a polyhedron e.g. a octahedron or an icosidodecahedron or a rhombicuboctahedron, a cylinder, a cone e.g. a truncated cone, a sphere e.g. a truncated sphere, an ellipsoid e.g. a truncated ellipsoid, or an ovoid e.g. a truncated ovoid.

Holder 50 may form a basket for containing one or more ingredients and/or one or more thermal-transfer elements. The basket may have one or more side openings 51 for an ingredient and/or thermal side transfer from inside to outside holder 50. The basket can be formed as a generally continuous single seat or as a plurality of seats 55 for the ingredient(s) and/or thermal-transfer element(s) such as a plurality of seats separated by partitions, e.g. generally radially projecting ribs or wings or edges 52.

The invention claimed is:

1. A machine for stirring a liquid food substance, the machine comprising:
   a container defining a cavity with a bottom and a peripheral wall for containing the liquid food substance to be stirred, the cavity extending generally along a generally upright central container axis and having a mouth configured for removing from the container the liquid food substance upon stirring;
   an impeller comprising an impelling member configured to be rotated in the cavity against the liquid food substance about an impeller axis that is generally identical or generally parallel to the generally upright central container axis, the impeller including an arrangement of driven magnetic elements in the form of permanent magnets;
   a motor having an output shaft that is magnetically coupled to the impelling member via the container bottom and/or the peripheral wall, the motor being configured for driving the impelling member, and the output shaft being configured for driving an arrangement of driving magnetic elements that cooperate magnetically with the arrangement of driven magnetic elements to drive the impeller in rotation, and
   one driven magnetic element of the arrangement of driven magnetic elements is positioned to:
      generally face a first driving magnetic element of the arrangement of driving magnetic elements in a generally attraction orientation relative to the one driven magnetic element, the first driving magnetic element driving the one driven magnetic element in rotation; and
      be off-set relative to a second driving magnetic element of the arrangement of driving magnetic elements in a generally repulsion orientation relative to the one driven magnetic element, the driving second magnetic element driving the one driven magnetic element in rotation;
   wherein the motor is located in a motor chamber separate from the container, the motor chamber being located in a docking station for removably receiving the container; and
   wherein a removal force in the range of 1 to 50 N is required to remove the impeller in a direction away from the arrangement of driving magnetic elements when the impeller is in place in the cavity in a position for being rotated against the liquid food substance.

2. The machine of claim 1, wherein the first and second driving magnetic elements are in a ring-like arrangement and/or located in or on a driving disc, and wherein the arrangement of driven magnetic elements is in a configuration that has one or more of the following features:
   in a generally parallel orientation with at least one of the first and second driving magnetic elements;
   located in or on a support rotating the impelling member; and
   in a ring-like arrangement.

3. The machine of claim 1, wherein the or each driven magnetic element generates with:
   a corresponding first driving magnetic element that is in a generally attraction orientation a cumulated attractive magnetic field; and
   a corresponding second driving magnetic element that is in a generally repulsion orientation a cumulated repulsive magnetic field,
   such that the cumulated repulsive magnetic field is greater than the attractive magnetic field.

4. The machine of claim 1, comprising a thermal conditioner configured for thermally conditioning the liquid food substance in the cavity.

5. The machine of claim 1, wherein the impelling member is spaced above the bottom of the cavity between:
   a maximum stirring distance when the impelling member is rotated at a maximum stirring level at a maximum stirring speed about the impeller axis; and
   a resting distance when the impelling member stands still at a resting level,
   the maximum stirring distance being greater than the resting distance.

6. The machine of claim 5, wherein the impelling member is spaced above the bottom of the cavity by a distance smaller than the maximum stirring distance.

7. The machine of claim 5, wherein a level of the impelling member above the bottom of the cavity depends on a speed at which the impelling member is rotated about the impeller axis and/or a viscosity of the liquid food substance that is being stirred.

8. The machine of claim 5, which comprises one or more travel stops configured for preventing the impelling member from moving:
  above a maximum height when rotated; and/or
  below a minimum height when standing still.

9. The machine of claim 8, wherein the one or more travel stops includes a stop projecting from the peripheral wall towards the container axis or formed by the bottom and/or a stop formed by a foot of the impeller and interfering with a downward movement of the impeller member below the minimum height.

10. The machine of claim 5, which comprises a guide configured for guiding the impelling member between the maximum stirring level and the resting level.

11. The machine of claim 5, wherein the impelling member is arranged to be driven automatically towards the bottom of the cavity when a speed of rotation of the impelling member is lowered from the maximum stirring speed towards stand still.

12. The machine of claim 11, wherein the speed of rotation of the impelling member is lowered from the maximum stirring speed towards stand still under the effect of gravity and/or magnetic effect.

13. The machine of claim 5, wherein the impeller has a support that is relatively movable to the impelling member and that is rotated to rotate the impelling member, the support having a drive surface.

14. The machine of claim 5, wherein the impelling member has a lifting surface.

15. The machine of claim 1, comprising a holder for holding one or more ingredients and/or one or more thermal-transfer elements, the holder being connected to the impelling member for being driven with the impelling member in the liquid food substance.

16. The machine of claim 15, wherein the holder forms a basket configured for containing the one or more ingredients and/or one or more thermal-transfer elements, the basket having one or more side openings for an ingredient and/or thermal side transfer from inside to outside the holder, the basket being formed as a generally continuous single seat or as a plurality of seats for the one or more ingredients and/or one or more thermal-transfer elements.

17. A machine for stirring a liquid food substance, the machine comprising:
  a container defining a cavity with a bottom and a peripheral wall for containing the liquid food substance to be stirred, the cavity extending generally along a generally upright central container axis and having a mouth configured for removing from the container the liquid food substance upon stirring;
  an impeller comprising an impelling member configured to be rotated in the cavity against the liquid food substance about an impeller axis that is generally identical or generally parallel to the generally upright central container axis, the impeller including an arrangement of driven magnetic elements in the form of permanent magnets;
  a motor having an output shaft that is magnetically coupled to the impelling member via the container bottom and/or the peripheral wall, the motor being configured for driving the impelling member, and the output shaft driving an arrangement of driving magnetic elements that cooperate magnetically with the arrangement of driven magnetic elements to drive the impeller in rotation; and
  one or more travel stops configured for preventing the impelling member from moving:
    above a maximum height when rotated; and/or
    below a minimum height when standing still;
  one driven magnetic element of the arrangement of driven magnetic elements is positioned to:
    generally face a first driving magnetic element of the arrangement of driving magnetic elements in a generally attraction orientation relative to the one driven magnetic element, the first driving magnetic element driving the one driven magnetic element in rotation; and
    be off-set relative to a second driving magnetic element of the arrangement of driving magnetic elements in a generally repulsion orientation relative to the one driven magnetic element, the driving second magnetic element driving the one driven magnetic element in rotation; and
  wherein the impelling member is spaced above the bottom of the cavity between:
    a maximum stirring distance when the impelling member is rotated at a maximum stirring level at a maximum stirring speed about the impeller axis; and
    a resting distance when the impelling member stands still at a resting level,
    the maximum stirring distance being greater than the resting distance.

18. A machine for stirring a liquid food substance, the machine comprising:
  a container defining a cavity with a bottom and a peripheral wall for containing the liquid food substance to be stirred, the cavity extending generally along a generally upright central container axis and having a mouth configured for removing from the container the liquid food substance upon stirring;
  an impeller comprising an impelling member configured to be rotated in the cavity against the liquid food substance about an impeller axis that is generally identical or generally parallel to the generally upright central container axis, the impeller including an arrangement of driven magnetic elements in the form of permanent magnets;
  a motor having an output shaft that is magnetically coupled to the impelling member via the container bottom and/or the peripheral wall, the motor being configured for driving the impelling member, and the output shaft driving an arrangement of driving magnetic elements that cooperate magnetically with the arrangement of driven magnetic elements to drive the impeller in rotation; and
  a guide configured for guiding the impelling member between the maximum stirring level and the resting level;
  one driven magnetic element of the arrangement of driven magnetic elements is positioned to:
    generally face a first driving magnetic element of the arrangement of driving magnetic elements in a generally attraction orientation relative to the one driven magnetic element, the first driving magnetic element driving the one driven magnetic element in rotation; and
    be off-set relative to a second driving magnetic element of the arrangement of driving magnetic elements in a generally repulsion orientation relative to the one driven magnetic element, the driving second magnetic element driving the one driven magnetic element in rotation; and
  wherein the impelling member is spaced above the bottom of the cavity between:

a maximum stirring distance when the impelling member is rotated at a maximum stirring level at a maximum stirring speed about the impeller axis; and a resting distance when the impelling member stands still at a resting level, the maximum stirring distance being greater than the resting distance.

19. A machine for stirring a liquid food substance, the machine comprising:

a container defining a cavity with a bottom and a peripheral wall for containing the liquid food substance to be stirred, the cavity extending generally along a generally upright central container axis and having a mouth configured for removing from the container the liquid food substance upon stirring;

an impeller comprising an impelling member configured to be rotated in the cavity against the liquid food substance about an impeller axis that is generally identical or generally parallel to the generally upright central container axis, the impeller including an arrangement of driven magnetic elements in the form of permanent magnets, and the impeller has a support that is relatively movable to the impelling member and that is rotated to rotate the impelling member, the support having a drive surface; and a motor having an output shaft that is magnetically coupled to the impelling member via the container bottom and/or the peripheral wall, the motor being configured for driving the impelling member, and the output shaft driving an arrangement of driving magnetic elements that cooperate magnetically with the arrangement of driven magnetic elements to drive the impeller in rotation;

one driven magnetic element of the arrangement of driven magnetic elements is positioned to:

generally face a first driving magnetic element of the arrangement of driving magnetic elements in a generally attraction orientation relative to the one driven magnetic element, the first driving magnetic element driving the one driven magnetic element in rotation; and be off-set relative to a second driving magnetic element of the arrangement of driving magnetic elements in a generally repulsion orientation relative to the one driven magnetic element, the driving second magnetic element driving the one driven magnetic element in rotation;

wherein the impelling member is spaced above the bottom of the cavity between:

a maximum stirring distance when the impelling member is rotated at a maximum stirring level at a maximum stirring speed about the impeller axis; and a resting distance when the impelling member stands still at a resting level, the maximum stirring distance being greater than the resting distance.

* * * * *